United States Patent [19]
Kaplan

[11] Patent Number: 5,629,766
[45] Date of Patent: May 13, 1997

[54] GLOBAL MTF MEASUREMENT SYSTEM

[75] Inventor: Eran Kaplan, Holon, Israel

[73] Assignee: Neuromedical Systems, Inc., Suffern, N.Y.

[21] Appl. No.: 523,871

[22] Filed: Sep. 6, 1995

[51] Int. Cl.$^6$ .................................................. G01M 11/02
[52] U.S. Cl. ................................................ 356/124.5
[58] Field of Search ................................... 356/124.5

[56] References Cited

U.S. PATENT DOCUMENTS 4,639,132  1/1987  Glatt et al. ..................... 356/124.5
4,653,909  3/1987  Kuperman ..................... 356/124.5

*Primary Examiner*—F. L. Evans
*Attorney, Agent, or Firm*—Renner, Otto, Boisselle & Sklar

[57] ABSTRACT

The MTF for an optical or electronic device(s) is evaluated over a substantial portion of an image signal. As a result, a composite MTF representing a more global evaluation is achieved. Furthermore, the MTF for all or part of a system can be evaluated in situ.

21 Claims, 8 Drawing Sheets

✳ ✳ ✳ ✳ MTF in focus
◇ ◇ ◇ ◇ MTF 8 microns above focus
⊖ ⊖ ⊖ ⊖ MTF 8 microns below focus 5,629,766

GLOBAL MTF MEASUREMENT SYSTEM

TECHNICAL FIELD

The present invention relates generally to modulation transfer function (MTF) measurements. More particularly, the present invention relates to MTF measurements performed globally within a system.

BACKGROUND OF THE INVENTION

A function that expresses the ability of an optical or electronic device to transfer signals faithfully as a function of the spatial or temporal frequency of the signal is commonly known as a modulation transfer function (MTF). The MTF is the ratio of the percentage modulation of a sinusoidal signal leaving to that entering the device over the range of frequencies of interest.

In the past, measurement of the MTF for a microscope or lens has typically involved analyzing a wedge (similar to four squares of a checkerboard) at a single location within an image plane. In optical systems including a plurality of devices cascaded in series (e.g., as in video microscopy), the MTFs of the component devices were evaluated separately. The overall MTF of the system was given by the product of the MTFs of the component devices.

However, there have been a number of drawbacks associated with such conventional methods and arrangements for evaluating the MTF of a device or system. For example, it has been found that the MTF measurement of a device based on a single wedge does not sufficiently reflect the integrity of the device, particularly in many high resolution applications. Furthermore, it has been burdensome to obtain separately the MTF of each component device in the system. This required physically separating the components of the system, thereby resulting in system down time. In addition, extended delays could occur as each component device was evaluated separately.

In view of the aforementioned shortcomings associated with conventional MTF analyses and arrangements, there has been a strong need in the art for an improved system and method for analyzing MTFs for one or more optical or electrical devices. In particular, there is a strong need for a system which evaluates the MTF measurements for a device globally rather than at a localized point. Moreover, there is a strong need for an arrangement whereby the MTF of the system can be evaluated in situ and in real time.

SUMMARY OF THE INVENTION

The present invention relates to a MTF analysis and arrangement which addresses the drawbacks encountered in the past. The MTF for optical and/or electronic device(s)is evaluated over a substantial portion of an image signal. As a result, a composite MTF representing a global evaluation is achieved. Furthermore, the MTF for all or part of a system can be evaluated in situ according to the present invention.

According to one aspect of the invention, in a system having one or more optical or electronic elements for obtaining an image of an object, means for obtaining a modulation transfer function including means for imaging the object in an image frame based on the elements; means for determining a modulation transfer function with respect to each of a plurality of locations within the image frame, the plurality of locations being substantially distributed within the image frame; and means for processing the modulation transfer functions obtained with respect to the plurality of locations to obtain a composite modulation transfer function for at least part of the system.

According to another aspect of the invention, in a system having one or more optical or electronic elements for obtaining an image of an object, a method for obtaining a modulation transfer function comprising imaging the object in an image frame via the elements; determining a modulation transfer function with respect to each of a plurality of locations within the image frame, the plurality of locations being substantially distributed within the image frame; and processing the modulation transfer functions obtained with respect to the plurality of locations to obtain a composite modulation transfer function for at least part of the system.

In accordance with yet another aspect of the invention, in a system having a plurality of optical or electronic elements cascaded together for obtaining an image of an object, means for obtaining a modulation transfer function including means for imaging the object in an image frame based on the elements; and means for determining a modulation transfer function for at least part of the elements in situ based on the image frame.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENTS

Figure 1:
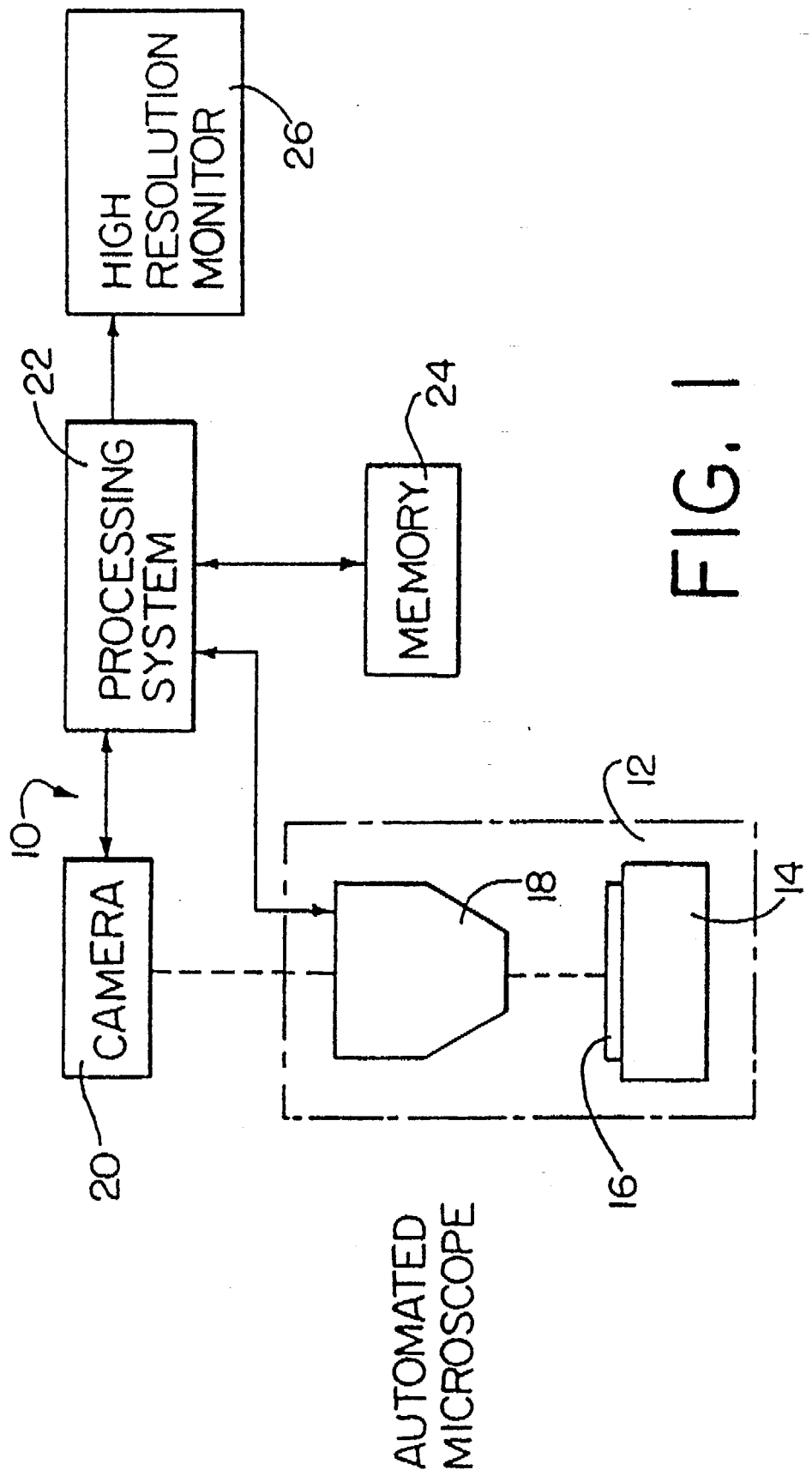
FIG. 1 is a block diagram of an optical system in accordance with the exemplary embodiment of the present invention.

The present invention will now be described with reference to the drawings wherein like reference numerals are used to identify like elements throughout. Referring initially to FIG. 1, there is shown an automated electro-optical system 10 in accordance with the present invention. Briefly, the system 10 includes an automated optical microscope 12 having a motorized stage 14 for the movement of an object 16 (e.g., a slide, wafer, etc.) relative to the viewing region of the viewing portion 18 of the microscope 12. A camera 20 obtains electronic images from the optical microscope 12, and a programmable processing system 22 connected to the camera 20 and the microscope 12 processes the image data obtained via the microscope 12. The system 10 also includes a memory 24 for storing image data, system software, and/or operating code, etc., and a high resolution color monitor 26 for the display of various image information.

The system shown in FIG. 1 is similar in arrangement to the automated classification system described in commonly assigned U.S. Pat. No. 5,257,182, the entire disclosure of which is incorporated herein by reference. However, it will be appreciated that the present invention has application for evaluating the MTF in virtually any electrical and/or optical system. As for the exemplary embodiment, the system is completely, or nearly completely, automated. As such the microscope 12 will preferably include, in addition to the motorized stage 14, automated apparatus for focusing, for changing lens objectives between high and low power, and for adjustment of the light incident on the object 16, as well as circuitry for controlling the movement of the motorized stage, typically in response to a command from the processing system. An example of an automated microscope performing at least some of these functions is manufactured by McBain Instruments of California.

During a scan, the microscope 12 scans the object 16 and the camera 20 takes electronic images of the object and sends the images to the processing system 22. According to the exemplary embodiment, the electronic image data obtained by the camera 20 with the microscope 12 in a given position constitutes one complete image frame. However, it will be appreciated that one or more contiguous images of the object 16 or portions thereof taken by the camera 20 via the motorized stage 14 can form a complete image frame in an alternate embodiment. In either case, the image frame data is preferably stored in the memory 24 using conventional techniques.

The processing system 22 preferably includes an image processor and digitizer together with a general processor as described more fully in the aforementioned '182 patent. The general processor is preferably a microprocessor based microcomputer although it may be any computer suitable for efficient execution of the functions described herein. The general processor controls the functioning of and the flow of data between components of the system 10, and handles the storage of image information. The general processor additionally controls the memory 24, focusing of the microscope 14 and movement of the stage 14.

The camera 20 can be a standard CCD-type video device providing image frame resolution on the order of approximately eighty (80) pixels per millimeter in a horizontal direction and approximately one-hundred (100) pixels per millimeter in a vertical direction. The output from the camera is digitized and processed in the processing system 22 according to conventional techniques in order to obtain and store the image frame data from the microscope as will be appreciated. As indicated above, the MTF of the system 10 is a useful measure of the ability of the system 10 to transfer image signals of the object 16. The MTF indicates the extent which the image of the object 16 can be faithfully transferred as a function of the spatial or temporal frequency of the image. As will be appreciated based on the following description, the processing system 22 can be programmed using conventional techniques known to those having ordinary skill in the art of computer programming to carry out the MTF evaluation functions described herein. The actual source code or object code for carrying out the MTF evaluation functions is stored in memory 24 and/or in internal memory in the processing system 22.

Figure 2:
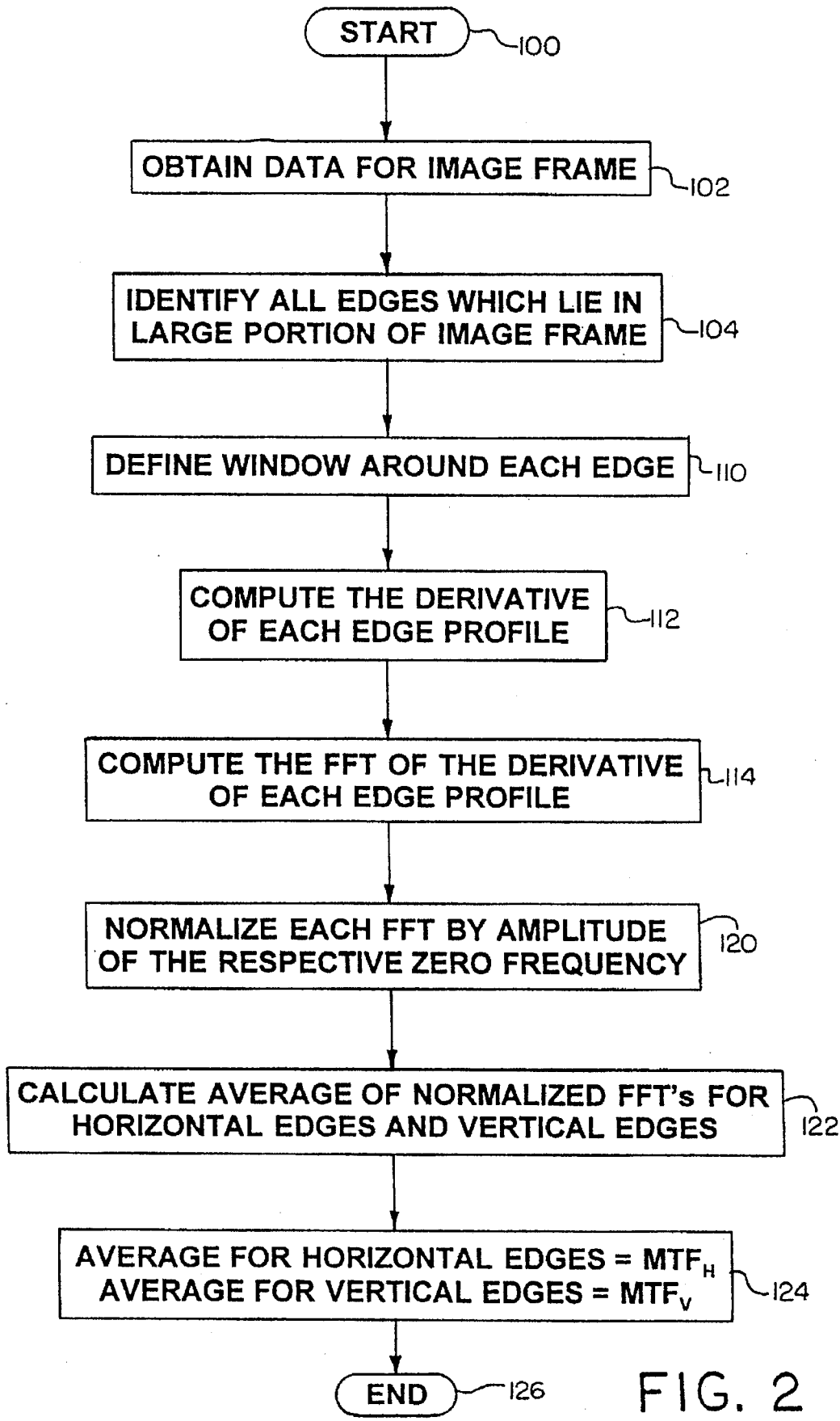
FIG. 2 is a system flowchart representing the various operations carried out by the processor in the system of FIG. 1 in accordance with the present invention.
Figure 3:
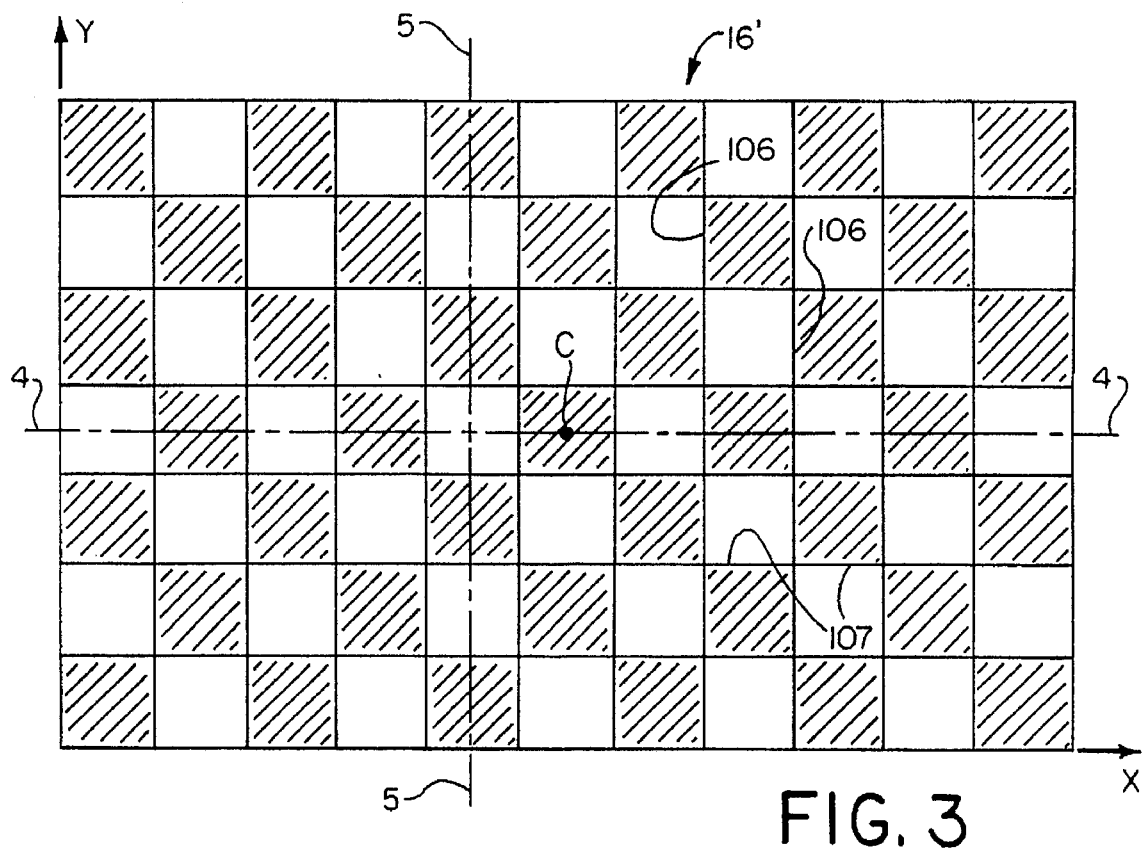
FIG. 3 represents an exemplary image frame pattern used for evaluating the MTF of the system of FIG. 1 in accordance with the present invention.

Referring to FIG. 2, the preferred procedure for performing MTF measurements will now be described. According to the preferred embodiment, the object 16 used for performing the MTF measurements is a checkerboard-like pattern 16' of white and black squares as represented in FIG. 3. The spatial frequency of the pattern 16' (i.e., the number of rows and columns per millimeter) is preselected in view of the desired range of the MTF test as will be appreciated. In the exemplary embodiment, the pattern 16' includes ten (10) rows per millimeter and ten (10) columns per millimeter, and is large enough to provide an entire image frame of data relative to the microscope 12 and camera 18. The pattern 16' is placed on the stage 14 (FIG. 1) and is preferably oriented such that its horizontal axis (parallel to each row) is aligned, nominally at least, with the x-axis of the microscope 12 and its vertical axis (parallel to each column) is aligned with the y-axis of the microscope 12. As for actual implementation, it is preferable that the horizontal and vertical axes of the pattern 16' be slightly rotated (approximately by 1 degree) in the x-y plane relative to the x and y axes of the microscope 12. This is done to avoid entire rows and/or columns of edges between corresponding rows and/or columns on the pattern 16' coinciding directly with a line separating adjacent rows and/or columns of pixels in the microscope 12. By slightly rotating the pattern 16', the possibility of many edges falling between adjacent pixels of the microscope is greatly reduced. This means that more edge data will be available from a given image frame. Nevertheless, for purposes of explanation of the invention, it is sufficient to consider the x and y axes of the pattern 16' as being aligned with the x and y axes of the microscope 12.

The center C of the pattern 16' can be aligned with the optical axis of the microscope as shown in FIG. 3, although this is not necessary as will be appreciated. In the preferred embodiment, the pattern 16' is much larger than the field of view of the microscope, so no alignment of the optical axis is necessary with respect to the actual center C of the pattern 16'.

Figure 4:
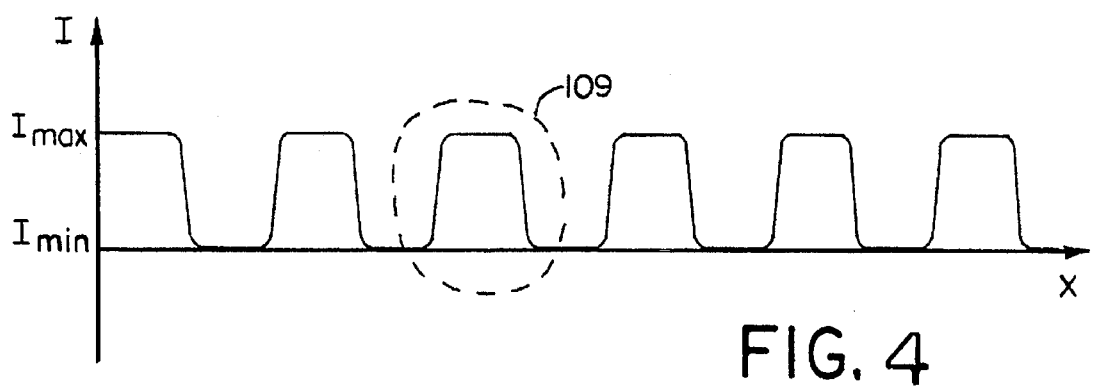
FIG. 4 is a waveform diagram representing the image data obtained in the system of FIG. 1 along the line 4—4 shown in FIG. 3.

As is shown in FIG. 2, the system 10 in step 100 is initialized for performing MTF measurements. Such initialization can occur based on a user input or the like, such as by clicking on an appropriate icon (not shown) on the monitor 26. In step 102, the microscope 12 and camera 20 snap an image of the test pattern 16' and provide image frame data to the processing system 22 whereby it is digitized and stored. FIG. 4 illustrates a portion of the image frame data taken along line 4—4 in the pattern 16' of FIG. 3. As can be seen from FIG. 4, the intensity of the image data signal varies between $I_{max}$ and $I_{min}$ relative to the x-axis in direct correspondence to the alternating white and black sections along the row. The image frame data taken along a vertical line (e.g., line 5—5) in the pattern 16' will be similar to that of FIG. 4 but will alternate between $I_{max}$ and $I_{min}$ relative to the y-axis as will be appreciated.

Figure 5:
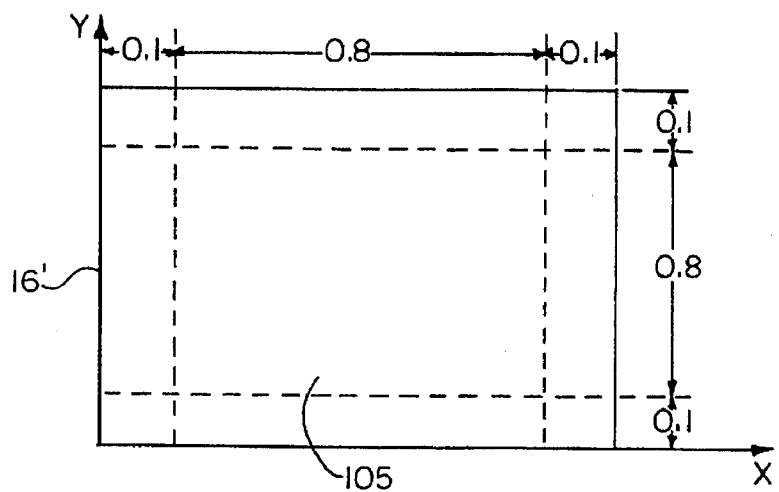
FIG. 5 represents a portion of the image frame in FIG. 3 in which the MTF measurements are conducted in accordance with the present invention.

Beginning in step 104, the processing system 22 processes the image frame data to identify the central major portion of the image frame. More specifically, as represented in FIG. 5 the processing system 22 identifies the central 80% of the image frame data with respect to both the x and y axes. This central portion 105 represents the central 64% of the image frame and it is the image frame data within this portion that will be further analyzed to determine the system MTF. It will be appreciated that a larger or smaller portion of the image frame may be selected in step 104 without departing from the scope of the invention. However, it is preferred that at least half of the image frame be considered when performing MTF measurements.

Continuing in step 104, the processing system 22 locates all of the edges which lie in the central portion 105 of the image frame. The term "edge" refers to the location where a black section adjoins a white section. In the exemplary embodiment, the central portion 105 will include both vertical oriented edges (e.g., edges 106) and horizontal oriented edges (e.g., edges 107) as represented in FIG. 3.

Figure 6:
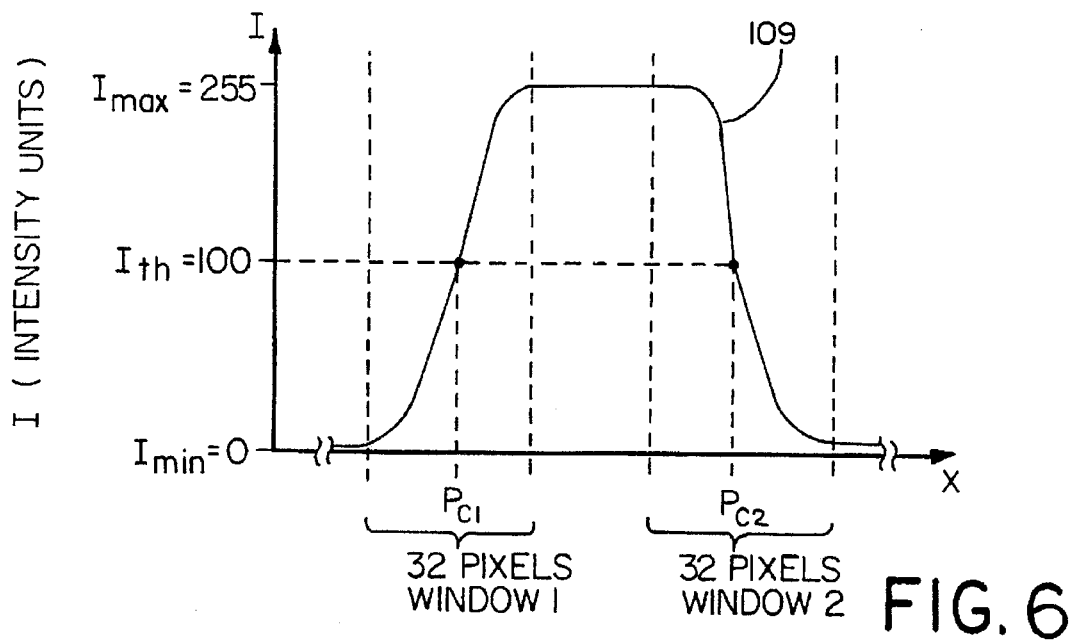
FIG. 6 is an enlarged view of a portion of the image data shown in FIG. 4.

As previously mentioned above, FIG. 4 illustrates an exemplary image signal taken along one of the rows in the pattern 16'. FIG. 6 shows an enlarged portion 109 of the image signal. Since the system 10 is not ideal, the image signal will not have the shape of a perfect square wave, but instead will have a relatively gradual slope as the image signal varies in the x-direction between $I_{max}$ and $I_{min}$. In the exemplary embodiment, $I_{max}$ =255 intensity units (IU) and $I_{min}$=0 IU. As will be appreciated by those having ordinary skill in the art of machine vision and the like, the leading edge of the waveform in FIG. 6 corresponds to an edge between a black section and a white section when viewing the pattern 16' from left to right as oriented in FIG. 3. Similarly, the trailing edge of the waveform in FIG. 6 corresponds to an edge between the same white section and an adjacent black section of the pattern 16'.

The particular location of each of these edges relative to the x-axis can be determined using any of a variety of machine vision techniques as will be appreciated by those familiar in the art. In the exemplary embodiment, a threshold intensity value $I_{th}$ is predefined somewhere between $I_{max}$ and $I_{min}$ (e.g., $I_{th}$=100 IU) and an edge is defined as the location at which the image signal crosses the threshold intensity value. Thus, as shown in FIG. 6, vertical edges 106 are located at locations x=$P_{c1}$ and x=$P_{c2}$. The processing system 22 determines the location of each of the vertical edges in the central portion 105 by analyzing the remaining image frame using the same criteria. Similarly, the processing system 22 analyzes the image frame data corresponding to each column of the pattern 16' in order to identify the location of each of the horizontal edges 107 in the central portion 105. The locations of each of the horizontal and vertical edges are then stored in the memory 24.

Referring again to FIG. 2, in step 110 the processing system 22 defines a data window around each respective horizontal and vertical edge located in step 104. According to the preferred embodiment, each window is centered about a corresponding edge location and is thirty-two pixels (or data points) in width. The width of the window can be greater or smaller without departing from the scope of the invention, although a given window should not contain information on two edges. In the preferred embodiment, each window is of sufficient width to encompass at least those data points which include the transition of the image signal from $I_{min}$ to $I_{max}$ or vice versa. Thus, it will be appreciated that depending on the frequency of the pattern 16' (i.e., the pitch) and the resolution of the system 10, the preferred window width minimum can vary. In any event, it is desirable that each window include data representing the complete profile of the corresponding edge.

Figure 7:
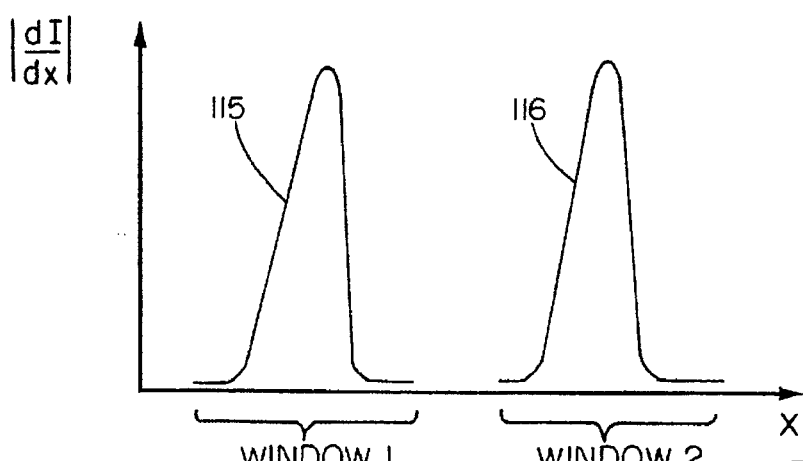
FIG. 7 illustrates the absolute value of the derivative of portions of the image data of FIG. 6 within windows centered about the edges of the image data in accordance with the present invention.

According to the invention, therefore, each of the windows defined in step 110 includes image frame data representing an edge profile as illustrated in FIG. 6. Although the image signal in FIG. 6 is shown as a continuous waveform, it will be appreciated that each edge profile as stored in the memory 24 is represented by digitized data at discrete intervals within the given window. The processing system 22 proceeds to step 112 (FIG. 2) wherein the processing system 22 computes the absolute value of the derivative of each edge profile identified in step 110. For example, FIG. 7 represents the absolute value of the derivative of the edge profiles represented in windows 1 and 2 in FIG. 6. Upon calculating the derivative of each edge profile, the processing system 22 then proceeds to step 114 in which the fast Fourier transform (FFT) is computed for each of the absolute values of the derivatives of the edge profiles. As an example, the processing system 22 computes the FFTs of the derivative signals 115 and 117 corresponding to windows 1 and 2 shown in FIG. 7, respectively. The FFTs for all of the respective horizontal and vertical edge profiles are computed in like manner and are stored by the processing system 22 in the memory 24.

Figure 8:
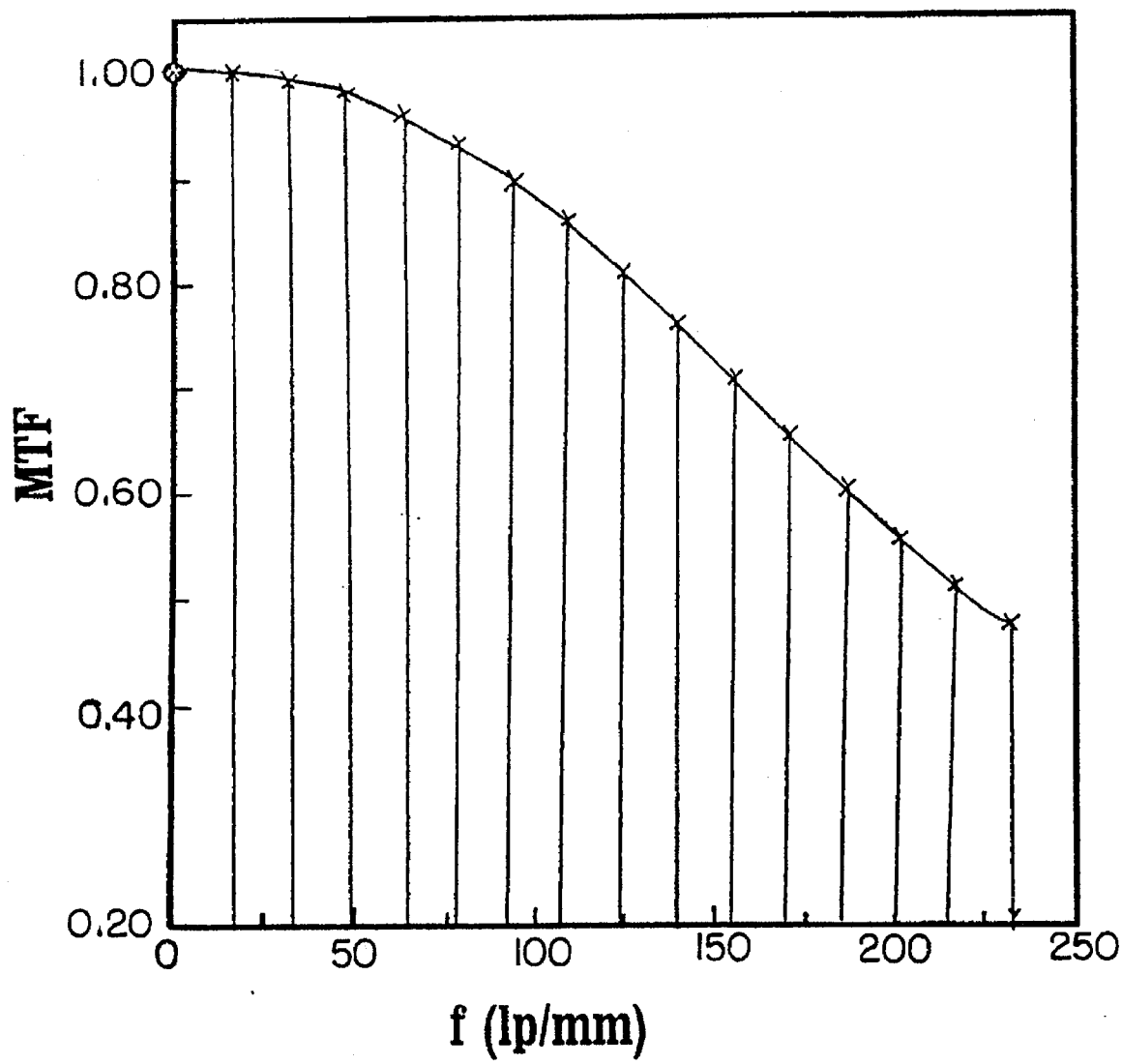
FIG. 8 illustrates the MTF of the system as evaluated at a given edge in the image frame pattern according to the present invention.

It can be shown that the Fourier transform of the derivative of a given edge profile allows the MTF of the edge to be evaluated directly. Thus, referring again to FIG. 2 the processing system 22 takes each of the FFTs calculated in step 114 and normalizes each FFT by amplitude with respect to its corresponding zero frequency component as represented in step 120. As an example, FIG. 8 illustrates a FFT of one of the vertical edge profiles. The FFT has been normalized with respect to the zero component so as to have a zero component equal to unity. Since the FFT is directly related to the MTF for the edge, the vertical axis of the FFT as represented in FIG. 8 provides the MTF value. The horizontal axis represents the spatial frequency component (in units of line-pairs per millimeter). The normalized FFT, and hence the MTF, for each vertical and horizontal edge in the central portion 105 of the image frame is thus calculated by the processing system 22 in step 120.

Figure 9:
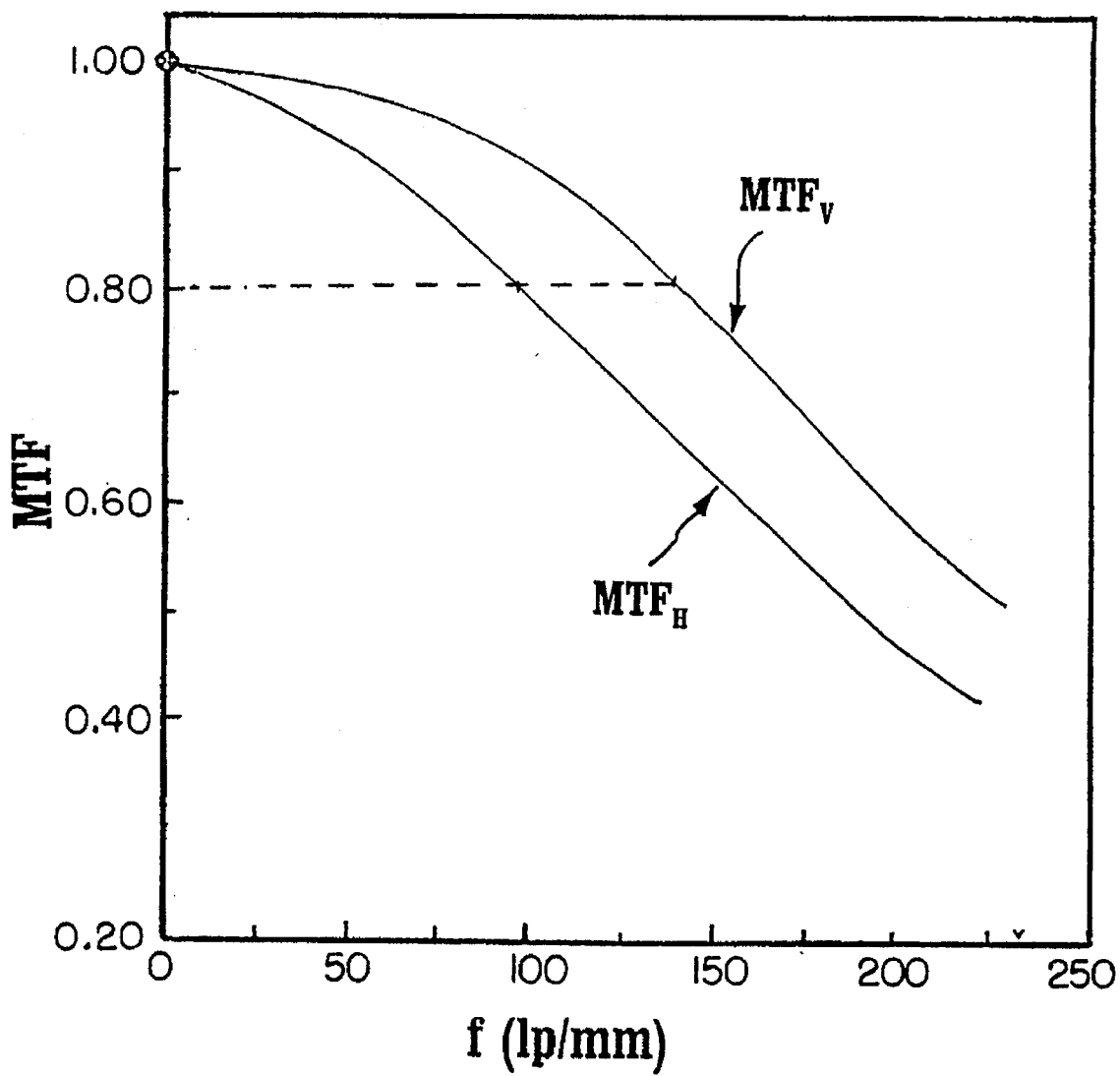
FIG. 9 illustrates a vertical MTF and horizontal MTF of the system as evaluated based on the average of the respective vertical and horizontal edge MTFs according to the present invention.

Following step 120, the processing system 22 in step 122 calculates the average normalized FFT of the vertical edges and the average normalized FFT of the horizontal edges for all of the vertical and horizontal edges, respectively, in the central portion 105. This is accomplished, for example, by computing the average value of each component in the normalized FFT with respect to each of the vertical and horizontal edges. Since each of the individual FFTs of the edge profiles is directly related to the MTF of the edge, the average of the normalized FFTs for the edges distributed throughout the central portion 105 presents an average or composite MTF for the system. Thus, in step 124 the processing system 22 identifies the average normalized FFT for the horizontal edges as the horizontal MTF for the system 10, or $MTF_h$. Similarly, the processing system 22 identifies the average normalized FFT for the vertical edges as the vertical MTF for the system 10, or $MTF_v$. The $MTF_h$ and $MTF_v$ functions are then stored in memory 24, output by the processing system 22 via the display 26, output via a printer (not shown), and/or are otherwise utilized. For example, FIG. 9 illustrates typical $MTF_v$ and $MTF_h$ curves which are obtained in relation to a system 10 such as that shown in FIG. 1. Following step 124 in FIG. 2, the processing system 22 proceeds to step 126 whereby the basic MTF evaluation is completed.

Unlike conventional techniques where the MTF of an optical or electronic component was evaluated primarily with respect to a single location within an image, it will be appreciated that the present invention evaluates the MTF over a large region within the image frame. In the exemplary embodiment, this is done by averaging the individual MTFs of a number of edges distributed about the image frame both in horizontal and vertical directions. However, desirable results could also be obtained by calculating the average MTFs for a single row or column of edges. In each case, the pattern 16' could be a simple bar pattern and the average MTF is based on the MTFs of edges distributed throughout a major portion of the image. As a result, a global MTF is obtained which is indicative of the MTF of the device as a whole. Thus, for example, the present invention can recognize if the MTF for a device is generally poor overall despite being good at a particular location, such as directly along its optical axis. Consequently, the present invention is capable of providing a more accurate indication of the ability of a device to transfer an image faithfully.

Furthermore, it will be appreciated that the present invention is able to evaluate the MTF of the system (or a portion thereof) in situ. In other words, the MTF as analyzed by the processing system 22 as described above in relation to the Figures represents the MTF of the microscope 12, the camera 20 and at least a portion of the processing system 22 (e.g., the digitizer therein). There is no need to disassemble the system 10 or otherwise evaluate the MTF of each of the components individually. All tests can be performed in situ and in real time, with the processing system 22 being programmed to carry out each of the functions described herein.

Upon obtaining the results of the MTF evaluation (e.g., the $MTF_h$ and $MTF_v$ functions) as described above, any number of further analyses can be conducted for evaluating the system 10. For example, the processing system 22 may be programmed to determine the frequency at which the MTF drops below a predefined threshold (e.g., 0.8) as shown in FIG. 9. Such frequency for both the horizontal and vertical MTFs provides an indication of the limitations on resolution for the system 10 as will be appreciated.

Furthermore, in a color system 10 the MTF of the red, green, and blue channels can be evaluated separately in the same manner described above. Thereafter, the MTFs of each channel can be compared in order to evaluate the optical performance of the system 10 for the different channels at a given plane of view.

Figure 10:
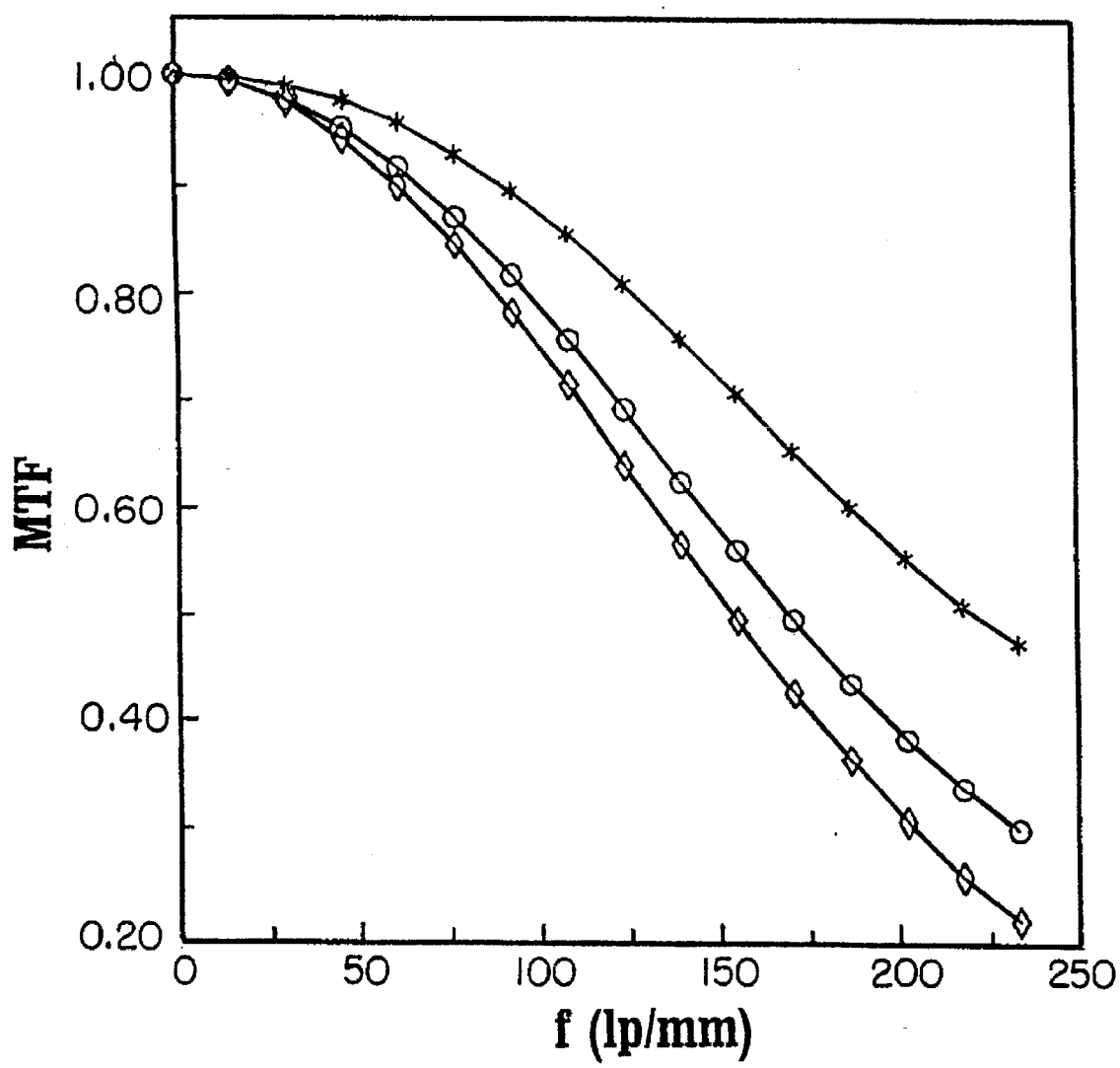
FIG. 10 represents MTF curves for the system in FIG. 1 as determined with the system in focus and out of focus in accordance with the present invention.

It is also possible to move the stage 14 up and down so as to adjust the height, and consequently the focus of the microscope 12 while evaluating the MTFs. FIG. 10 provides exemplary $MTF_v$s for the system 10 when the microscope 12 is in focus, is eight microns above focus, and is eight microns below focus. As can be seen, the MTF drops off significantly at the higher frequencies as the system goes out of focus.

Figure 11:
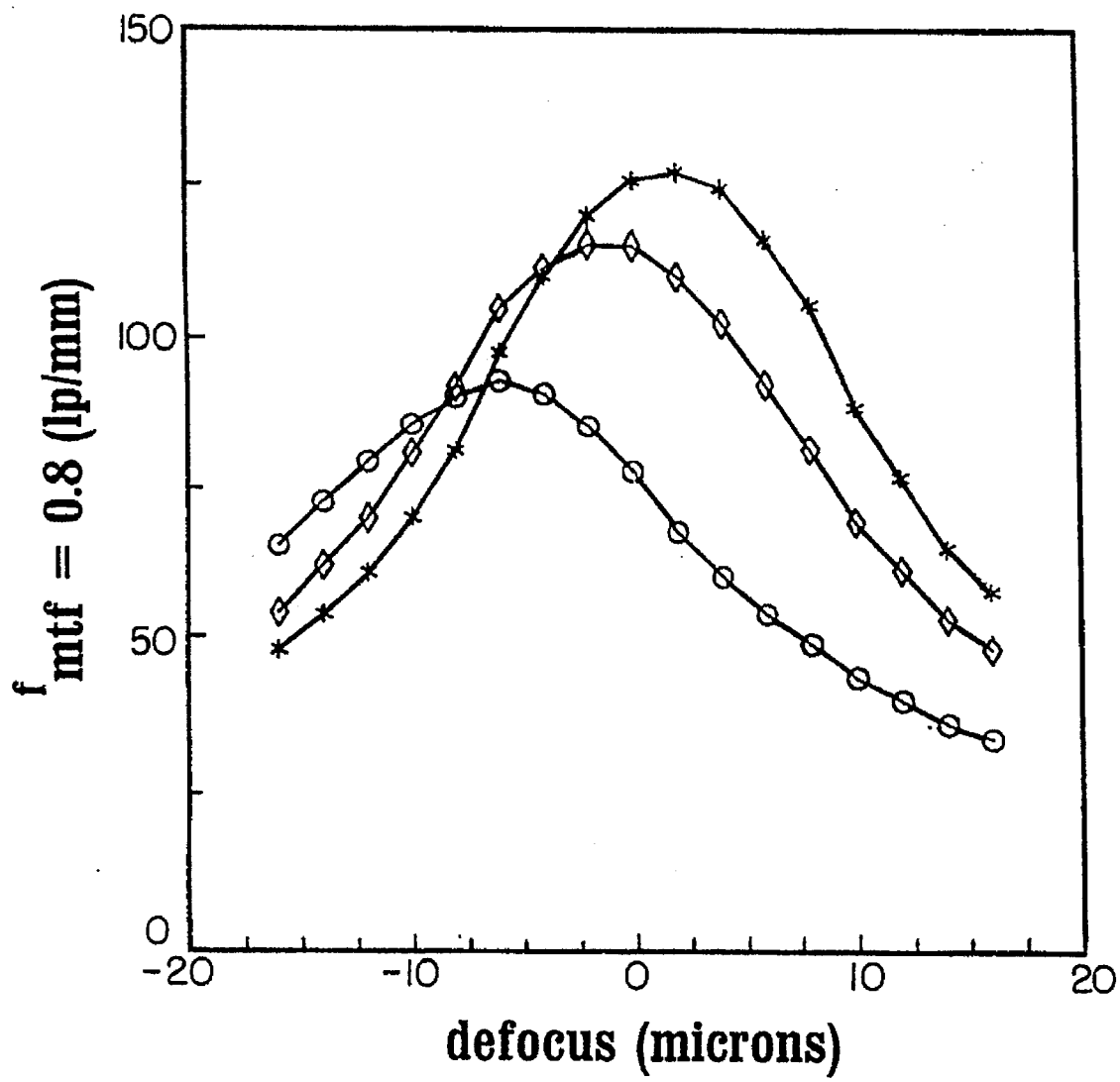
FIG. 11 represents focus curves for the RGB channels as computed based on the MTFs in accordance with the present invention.

Using a color system 10, the height of the stage 14 can be adjusted while evaluating the MTFs of the red, green and blue channels for different heights. In this manner, it is possible to calculate the manner in which the microscope 12 focuses or defocuses. For example, the height of the stage 14 may be varied between +16 μm and −16 μm in steps of 2 μm, where 0 μm represents the nominal focus point. The overall MTF for each channel (e.g., $MTF_v$ or $MTF_h$) is evaluated to determine the frequency at which the MTF equals 0.8 as discussed above. These frequencies are then plotted vs. the height of the stage 14 to form focus curves as shown in FIG. 11. The vertical axis in FIG. 11 corresponds to the frequency at which the MTF equals 0.8, and the horizontal axis corresponds to the height of the stage 14. The peaks of the curves correspond to the focus planes of the corresponding channels. In this manner, the difference between the locations of the peaks relative to the stage height illustrate the difference in focus planes between the red, green and blue channels.

Based on the curves shown in FIG. 11, the processing system 22 can be programmed to determine the optimum focus resolution of the three color channels using known optimization techniques. Similarly, curves such as those shown in FIG. 11 can be used to evaluate the effectiveness of any auto-focus algorithm utilized in the system 10, or to determine the depth of focus (DOF) of the system 10.

It will be appreciated that each of the above analyses can be performed in situ by virtue of the system 10 being able to determine the MTF in situ in accordance with the present invention. Performing such evaluations in the past would have required substantial amounts of time, particularly with respect to separately measuring the MTFs of the various components. The present invention avoids such a problem by permitting the MTF to be measured in situ and in real time.

Although the invention has been shown and described with respect to certain preferred embodiments, it is obvious that equivalents and modifications will occur to others skilled in the art upon the reading and understanding of the specification. For example, although the invention is described primarily as using an average of the MTFs for the individual edges to obtain a composite MTF for the system, it will be appreciated that some other analysis may be used to determine a composite MTF such as by analyzing the distribution of the individual MTFs. Furthermore, although specific processing steps were described herein for determining the MTF, other procedures may be used without departing from the scope of the invention. As an example, step 120 in FIG. 2 may also include the additional steps of computing the FFT of a numerically perfect edge and using the "perfect edge" FFT it to normalize the FFT of each of the edges as obtained in step 114.

The present invention includes all such equivalents and modifications, and is limited only by the scope of the following claims.

What is claimed is:

1. In a system having one or more optical or electronic elements for obtaining an image of an object, means for obtaining a modulation transfer function comprising:
   means for imaging the object in an image frame based on the elements;
   means for determining a modulation transfer function with respect to each of a plurality of locations within the image frame, the plurality of locations being substantially distributed within the image frame; and
   means for processing the modulation transfer functions obtained with respect to the plurality of locations to obtain a composite modulation transfer function for at least part of the system.

2. In a system according to claim 1, wherein the object comprises a pattern having an edge at each of the plurality of locations.

3. In a system according to claim 2, wherein the pattern comprises a bar pattern.

4. In a system according to claim 2, wherein the pattern comprises a checkerboard-like arrangement.

5. In a system according to claim 4, wherein the means for processing obtains a composite modulation transfer function for each of two orthogonal directions.

6. In a system according to claim 1, wherein the means for determining comprising means for obtaining image data corresponding to an edge in the image at each of the plurality of locations, determining the derivative of the image data, and calculating the Fourier transform of the derivative of the image data.

7. In a system according to claim 6, wherein the means for processing averages the Fourier transforms obtained with respect to each of the plurality of locations.

8. In a system according to claim 1, wherein the plurality of locations are distributed throughout a majority of the image frame.

9. In a system according to claim 8, wherein the plurality of locations are substantially evenly distributed throughout a central majority of the image frame.

10. In a system according to claim 1, wherein the means for obtaining is capable of obtaining the composite modulation transfer function based on in situ, real time evaluation of the system.

11. In a system having one or more optical or electronic elements for obtaining an image of an object, a method for obtaining a modulation transfer function comprising:

imaging the object in an image frame via the elements;

determining a modulation transfer function with respect to each of a plurality of locations within the image frame, the plurality of locations being substantially distributed within the image frame; and processing the modulation transfer functions obtained with respect to the plurality of locations to obtain a composite modulation transfer function for at least part of the system.

12. The method according to claim 11, wherein the object comprises a pattern having an edge at each of the plurality of locations.

13. The method according to claim 12, wherein the pattern comprises a bar pattern.

14. The method according to claim 12, wherein the pattern comprises a checkerboard-like arrangement.

15. The method according to claim 14, wherein the step of processing obtains a composite modulation transfer function for each of two orthogonal directions.

16. The method according to claim 11, wherein the step of determining comprises the steps of obtaining image data corresponding to an edge in the image at each of the plurality of locations, determining the derivative of the image data, and calculating the Fourier transform of the derivative of the image data.

17. The method according to claim 16, wherein the step of processing averages the Fourier transforms obtained with respect to each of the plurality of locations.

18. The method according to claim 11, wherein the plurality of locations are distributed throughout a majority of the image frame.

19. The method according to claim 18, wherein the plurality of locations are substantially evenly distributed throughout a central majority of the image frame.

20. The method according to claim 11, wherein the step of obtaining is capable of obtaining the composite modulation transfer function based on in situ, real time evaluation of the system.

21. In a system having a plurality of optical or electronic elements cascaded together for obtaining an image of an object, means for obtaining a modulation transfer function comprising:

means for imaging the object in an image frame based on the elements; and means for determining a modulation transfer function for at least part of the elements in situ based on the image frame.

* * * * *